(12) United States Patent
Hoyt et al.

(10) Patent No.: US 8,395,525 B2
(45) Date of Patent: Mar. 12, 2013

(54) EXTENDING THE READ RANGE OF PASSIVE RFID TAGS

(75) Inventors: Joshua K. Hoyt, Portland, OR (US); Forrest S. Seitz, Beaverton, OR (US); Vaynberg Eduard, Portland, OR (US)

(73) Assignee: Magnet Consulting, Inc., Los Angeles, CA (US)

( * ) Notice: Subject to any disclaimer, the term of this patent is extended or adjusted under 35 U.S.C. 154(b) by 662 days.

(21) Appl. No.: 12/392,736

(22) Filed: Feb. 25, 2009

(65) Prior Publication Data
US 2009/0289773 A1 Nov. 26, 2009

Related U.S. Application Data

(63) Continuation-in-part of application No. 12/351,774, filed on Jan. 9, 2009.

(60) Provisional application No. 61/031,270, filed on Feb. 25, 2008, provisional application No. 61/046,671, filed on Apr. 21, 2008.

(51) Int. Cl.
*G08B 23/00* (2006.01)
*G08B 13/14* (2006.01)
*H04Q 5/22* (2006.01)
*H02M 7/15* (2006.01)

(52) U.S. Cl. .................. 340/693.1; 340/572.1; 340/10.4; 340/10.2; 340/10.33; 340/572.8; 363/89

(58) Field of Classification Search ............... 340/572.1, 340/10.4, 10.2, 10.33, 572.8
See application file for complete search history.

(56) References Cited

U.S. PATENT DOCUMENTS 2,339,234 A * 1/1944 Polydoroff .................... 343/788
2,579,978 A 12/1951 Snoek et al.
(Continued)

FOREIGN PATENT DOCUMENTS

CN 1706205 A 12/2005
WO 2007030862 A1 3/2007

OTHER PUBLICATIONS

International Search Report (from a corresponding foreign application), PCT/US2009/035144, mailed Apr. 27, 2009.

(Continued)

*Primary Examiner* — Brian Zimmerman
*Assistant Examiner* — Omeed Alizada
(74) *Attorney, Agent, or Firm* — Fountainhead Law Group P.C.

(57) ABSTRACT

An embodiment of the present invention improves the efficiency of radio frequency identification (RFID) systems and helps to extend the effective read range for certain configurations of closely spaced RFID tags. Specifically, an embodiment helps to minimize energy losses that result when there is excess energy from the excitation source. This excess energy has the potential to damage the circuitry in RFID tags. A shunt regulator is often used to protect the RFID circuitry by clamping the voltage, but has the undesirable effect of converting this excess excitation energy into heat. Various embodiments are directed toward using only as much of the excitation energy as necessary to power the RFID circuitry. These embodiments include circuitry for a constant current power supply that can be implemented either with discrete components or built into a new ASIC design; a network that minimizes the amount of energy that is converted to heat by the shunt regulator built into many RFID circuits; and/or a sleep mode for reducing the energy consumed by an RFID tag after it has been read. An embodiment may have the benefit of making more of the excitation energy available to power other RFID tags nearby—thereby improving system performance and read range.

21 Claims, 8 Drawing Sheets

U.S. PATENT DOCUMENTS

| | | | |
|---|---|---|---|
| 6,021,949 | A | 2/2000 | Boiron |
| 6,134,130 | A | 10/2000 | Connell et al. |
| 6,518,884 | B1 | 2/2003 | Tanji et al. |
| 6,581,747 | B1 | 6/2003 | Charlier et al. |
| 6,980,077 | B1 | 12/2005 | Chandrasekaran et al. |
| 7,088,304 | B2 | 8/2006 | Endo et al. |
| 7,119,664 | B2 | 10/2006 | Roesner |
| 7,262,680 | B2 | 8/2007 | Wang |
| 7,268,687 | B2 | 9/2007 | Egbert et al. |
| 7,482,930 | B2 | 1/2009 | Song et al. |
| 7,503,491 | B2 | 3/2009 | Zhu et al. |
| 7,918,455 | B2 | 4/2011 | Chapet et al. |
| 2002/0180602 | A1 | 12/2002 | Yoakum |
| 2006/0202804 | A1* | 9/2006 | Vijay-Pillai et al. ........ 340/10.33 |
| 2007/0060311 | A1 | 3/2007 | Rowe et al. |
| 2007/0096881 | A1 | 5/2007 | Pillai |
| 2007/0114846 | A1* | 5/2007 | Pavlovic ........................ 307/9.1 |
| 2007/0171065 | A1 | 7/2007 | Ku et al. |
| 2007/0194931 | A1* | 8/2007 | Miller et al. ............... 340/572.7 |
| 2007/0200712 | A1 | 8/2007 | Arneson et al. |
| 2008/0003457 | A1 | 1/2008 | Endo |
| 2008/0048834 | A1* | 2/2008 | Lenevez ....................... 340/10.3 |
| 2008/0180249 | A1 | 7/2008 | Butler et al. |
| 2009/0221364 | A1 | 9/2009 | Richard et al. |
| 2009/0267742 | A1 | 10/2009 | Hecht et al. |

OTHER PUBLICATIONS

Magellan Technology, White Paper, "Comparison between 125kHz Low Frequency (LF) and 13.56 MHz High Frequency (HF)," RTF, Sydney. Jul. 5, 2005.

Megellan Technology, Product List, Inlets and Labels, May 2007.

Megellan Technology, White Paper, "A Comparison of RFID Frequencies and Protocols," Mar. 31, 2006.

Infineon, Short Product Information, Dec. 2005.

International Search Report (from a corresponding foreign application), PCT/US10/020553, mailed May 3, 2010.

International Search Report (from a corresponding foreign application), PCT/US2009/041275, mailed Jun. 16, 2009.

International Search Report (from a corresponding foreign application), PCT/US09/030679, mailed Mar. 2, 2009.

Office Action for Chinese Patent Application No. 200980106434.7 mailed Jun. 5, 2012.

* cited by examiner

EXTENDING THE READ RANGE OF PASSIVE RFID TAGS

CROSS REFERENCE TO RELATED APPLICATIONS

The present application claims priority to U.S. Provisional Application No. 61/031,270 titled "Dynamic Power Absorption of a Loop Antenna for Passive RFID Tags" filed Feb. 25, 2008; and to U.S. Provisional Application No. 61/046,671 titled "Dynamic Power Regulation of a Loop Antenna for Passive RFID Tags Using a Varactor" filed Apr. 21, 2008; which are incorporated herein by reference. The present application is a continuation in part (CIP) of U.S. patent application Ser. No. 12/351,774 titled "Enhancing the Efficiency of Energy Transfer to/from Passive ID Circuits Using Ferrite Cores" filed Jan. 9, 2009, which is incorporated herein by reference.

BACKGROUND

The present invention relates to passive radio frequency identification (RFID) tags, and in particular, to improved power efficiencies in passive RFID tags by minimizing excess power consumption.

Unless otherwise indicated herein, the approaches described in this section are not prior art to the claims in this application and are not admitted to be prior art by inclusion in this section.

Typical RFID tags consist of an RFID chip mounted on an inlay with an antenna. The antenna is tuned to maximize sensitivity (and hence read range) at a specified operating frequency. In normal operation, an excitation source (e.g., RFID reader) generates a carrier frequency that energizes the RFID tag and bi-directional data is superposed on this carrier. One or two volts is usually sufficient to power the RFID chip.

When a tag is very close to the excitation source, the voltage generated by its antenna can potentially exceed the rating of the RFID circuit. A shunt regulator is the most common way to protect the circuit against this potential source of damage. This shunt regulator protects the RFID circuit by dumping the excess energy as heat. For most RFID applications, this energy loss does not meaningfully detract from system performance.

Some RFID applications, however, require reading tags that are closely spaced. Unfortunately, closely spaced RFID tags tend to couple, shifting their resonance frequency from that of the carrier to some unknown frequency. This shift causes a breakdown in the transfer of energy and data between reader and tags. The more closely coupled the tags, the greater the shift in resonance, and the greater the degradation in system performance.

One solution that has been developed—with limited results—is to not tune the RFID tag to minimize the coupling between adjacent tags. See, for example, products from Magellan Technology Pty Ltd, Sydney, Australia. However, this solution has poor spatial discrimination. Attempts to improve spatial discrimination may themselves introduce further issues, such as collapsing the field and severely limiting the read range. To counter the limited read range, various range extension solutions may be implemented. Unfortunately, when these range extension solutions are combined with closely spaced "off-the-shelf" RFID tags, the shunt regulator exhibits a self-limiting behavior. Specifically, the shunt regulator in the tags nearest the excitation source (the reader) clamp the voltage at the output of the coil antenna in the tag. Since the tags are closely spaced, the voltage available to nearby tags is limited to this clamped voltage. Any losses (and there are always losses) further reduce the available voltage to where the tags do not have sufficient power to operate. As noted above, this shunt regulator acts to protect the RFID circuit (a good thing) but—in the case of closely spaced tags—the shunt regulator reduces the read range of the system.

Thus, there is a need for circuits that protect the sensitive circuitry in RFID tags without burning up excess energy as heat.

SUMMARY

An embodiment of the present invention improves the efficiency of radio frequency identification (RFID) systems and helps to extend the effective read range for certain configurations of closely spaced RFID tags. Specifically, an embodiment helps to minimize energy losses that result when there is excess energy from the excitation source. This excess energy has the potential to damage the circuitry in RFID tags. A shunt regulator is often used to protect the RFID circuitry by clamping the voltage, but has the undesirable effect of converting this excess excitation energy into heat. Various embodiments are directed toward using only as much of the excitation energy as necessary to power the RFID circuitry. These embodiments include circuitry for a constant current power supply that can be implemented either with discrete components or built into a new ASIC design; a network that minimizes the amount of energy that is converted to heat by the shunt regulator built into many RFID circuits; and/or a sleep mode for reducing the energy consumed by an RFID tag after it has been read. An embodiment may have the benefit of making more of the excitation energy available to power other RFID tags nearby—thereby improving system performance and read range.

According to an embodiment, a method of performing radio frequency identification (RFID) includes (a) generating, by an RFID reader, an excitation signal that includes a first read command. The method further includes (b) generating, by a first plurality of RFID tags, a first plurality of responses as part of the excitation signal. The method further includes (c) decoding, by the RFID reader, the first plurality of responses from the excitation signal. The method further includes (d) transmitting, by the RFID reader, a sleep command to each of the first plurality of RFID tags using the excitation signal. The method further includes (e) decoupling, by the first plurality of RFID tags, from an excitation field generated by the excitation signal in response to receiving the sleep command. The method further includes repeating (a), (b), (c), (d) and (e) for a second plurality of RFID tags.

According to an embodiment, an apparatus includes a circuit for performing radio frequency identification (RFID). The circuit includes an antenna, and RFID electronics coupled to the antenna that activates in response to receiving an excitation signal, that generates a response as part of the excitation signal, that receives a sleep command as part of the excitation signal, and that decouples from an excitation field generated by the excitation signal in response to the sleep command.

According to an embodiment, an apparatus includes a circuit for performing radio frequency identification (RFID). The circuit includes an antenna that receives energy from an excitation source, RFID electronics, and a linear power supply coupled between the antenna and the RFID electronics. The linear power supply extracts from the energy a constant current to operate the RFID electronics, wherein the constant current is sufficient to power the RFID electronics and manages any excess excitation energy such that energy consumption is reduced. The energy consumption is reduced such that it is less than that of a non-constant current design exposed to a similar excitation field (i.e., the energy consumption is less than an unmodified energy consumption, wherein the unmodified energy consumption corresponds to an unmodified apparatus having the antenna and the RFID electronics without the linear power supply).

According to an embodiment, an apparatus includes a circuit for performing radio frequency identification (RFID). The circuit includes an antenna, RFID electronics including a protective circuit, and a network coupled between the antenna and the RFID electronics that reduces electrical energy provided by the antenna to the RFID electronics.

The following detailed description and accompanying drawings provide a better understanding of the nature and advantages of the present invention.

BRIEF DESCRIPTION OF THE DRAWINGS

FIG. 4A is a top view (cut away), FIG. 4B is a bottom view (cut away)

DETAILED DESCRIPTION

Described herein are techniques for minimizing energy losses in passive RFID (radio frequency identification) tags. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

The present application may use one or more of the terms "and", "or", and "and/or". These terms are to be considered to have the same meaning and are to be read as an inclusive or; for example, "X and Y" means the same as "X or Y" and includes "only X", and "X or Y" includes "both X and Y". When all items joined with "and" are required, or when only one item joined with "or" is required, this will be specifically noted (e.g., "both X and Y are required").

As described above, various range extension solutions may be implemented to increase the read range for de-tuned tags. According to one embodiment, the specific range extension solution is to include in the RFID tag a magnetically permeable material as described in U.S. patent application Ser. No. 12/351,774 titled "Enhancing the Efficiency of Energy Transfer to/from Passive ID Circuits Using Ferrite Cores" filed Jan. 9, 2009, which is incorporated herein by reference.

This disclosure is organized as follows. First, various embodiments are described that can be applied to "new" RFID tag designs (where the circuit designer has the freedom to optimize the design of the RFID tag power supply). Second, various embodiments are described that include a circuit network that can be applied to "existing" RFID tag designs (which have a built-in shunt regulator).

The "New Design" Embodiments

The "new" embodiments use two different approaches to limit the power consumed by an individual RFID tag in order to extend the read range: (1) a linear constant-current power supply; and (2) a SLEEP mode.

As noted earlier, existing RFID tags use a shunt regulator to protect the tag circuitry. In most applications, this circuit is simple and efficacious. In the case where circuits are closely spaced and closely coupled (e.g., a stack of gaming tokens with ferrite cores such as described in U.S. patent application Ser. No. 12/351,774), however, there may be an unwanted consequence of this architecture: Tags near the excitation source burn up excess energy as heat-making that energy unavailable for other tokens.

A linear constant current power supply, on the other hand, extracts only the current required to operate the tag, thus consuming less of the energy. This circuitry adds complexity to the RFID tag but the improvement in read range is marked.

In addition, the energy extracted by a tag can be further reduced using a SLEEP mode.

Figure 1:
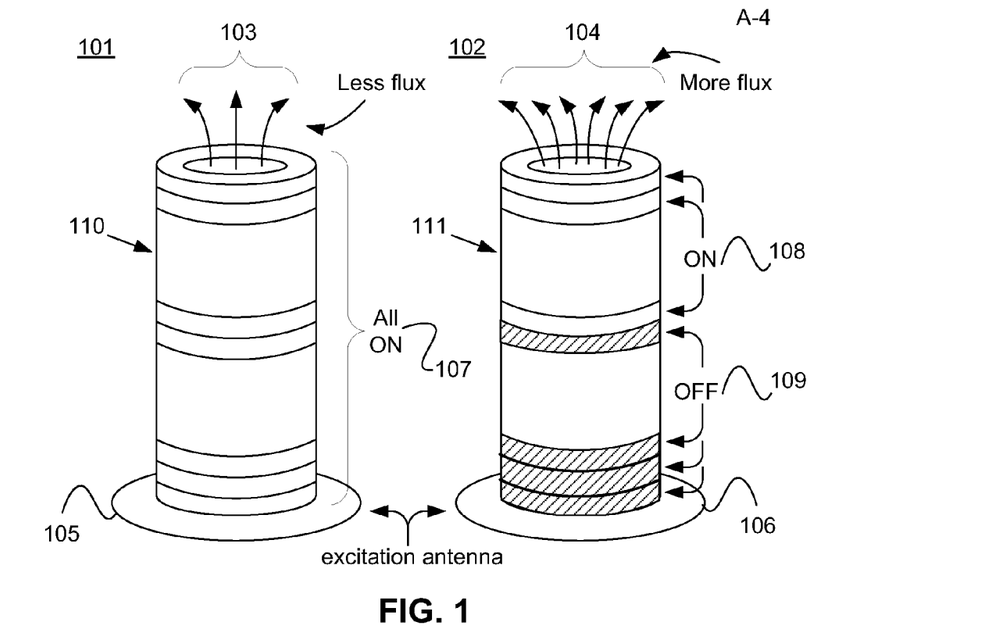
FIG. 1 shows the magnetic flux between a static RFID system (one without a SLEEP mode) and a dynamic RFID system (one with a SLEEP mode) according to an embodiment of the present invention.

FIG. 1 shows the magnetic flux between a static RFID system 101 (one without a SLEEP mode) and a dynamic RFID system 102 (one with a SLEEP mode) according to an embodiment of the present invention. The static RFID system 101 includes an excitation antenna 105 and a stack of gaming tokens 110. The excitation antenna 105 may be part of an RFID reader (not shown). The RFID reader may transmit an excitation signal and, in accordance therewith, establish an excitation field 103. Each token of the stack of gaming tokens 110 may include an RFID tag coupled to the excitation field and this may create an RFID tag load corresponding to all the tags 107. The RFID tag load absorbs the power from the excitation field 103 and reduces the excitation field strength. The excitation field strength is denoted by the number of arrows used to show the excitation field 103. The excitation field strength may be influenced by the RFID tag load.

The dynamic RFID system 102 includes an excitation antenna 106 and a stack of gaming tokens 111. The excitation antenna 106 may be part of an RFID reader (not shown). The RFID reader may transmit an excitation signal and, in accordance therewith, establish an excitation field 104. Each token of the stack of gaming tokens 111 may include an RFID tag. Initially each RFID tag associated with the stack of gaming tokens 111 may be coupled to the excitation field 104. As an RFID tag is read, the reader sends a command signal to the RFID tag to "decouple" from the excitation field 104. This may be accomplished by any of a number of methods—as long as they achieve the intended function of reducing the energy extracted by the RFID tag from the excitation field 104. These methods include, for example, (1) opening an antenna loop of the RFID tag; or (2) reducing the power of the RFID circuit (e.g. by putting the processor in SLEEP mode). After some time, a portion 109 of the RFID tags are "off" and the remaining portion 108 of the RFID tags stay coupled to the excitation field 104. The result: while the total output power of the excitation field remains unchanged, the flux density through the center of the stack of tokens increases each time a token in the stack is decoupled. This increased field strength is denoted by the number of arrows used to show the excitation field 104. The excitation field strength may be influenced by the RFID tag load. Since the RFID tag load of the system 102 is less than the RFID tag load of the static RFID system 101, the flux density of the dynamic system 102 is greater than the flux density of the static RFID system 101. This may increase the read range of the RFID reader. This increased read range may allow for the RFID reader to read the portions of RFID tags 111 that were previously beyond the static read range. This may allow for a greater stack of game tokens (or other stacked item containing an embedded dynamic RFID tag) to be read by an RFID reader for a given excitation power output.

After the RFID tags are all read, the excitation signal and therefore the excitation field may turn off. This may allow the RFID tags to reset to a condition in which the RFID tags may become coupled to the excitation field once more when the excitation field is turned on again. A reset may be induced by a cycling of the excitation field. The time associated with the turning off and turning back on of the excitation field may be dictated by the implementation of the RFID tags and the dynamic circuit which controls how the RFID decouples from the excitation field.

Figure 2:
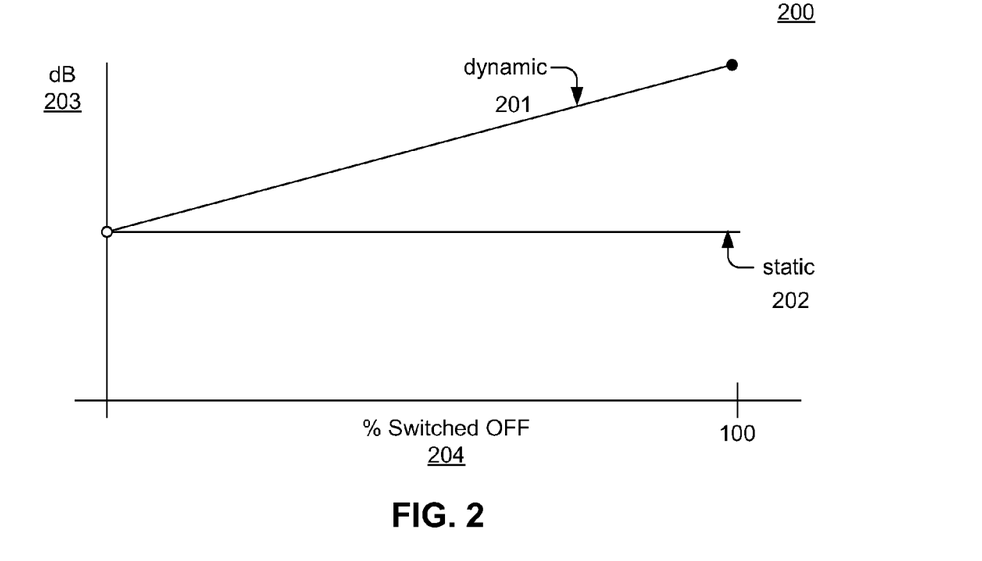
FIG. 2 illustrates a graph of the projected performance enhancement of a dynamic RFID system according to an embodiment of the present invention.

FIG. 2 illustrates a graph 200 of the projected performance enhancement of a dynamic RFID system according to an embodiment of the present invention. The graph 200 shows the power available at a given tag corresponding to a fixed excitation antenna output power. Line 202 representing the power available at this tag for a static system similar to the static RFID system 101 of FIG. 1. The line 202 shows that the excitation field strength 203 remains constant. The graph 200 shows line 201 representing the power available at this same tag for a dynamic system similar to the dynamic RFID system 102 of FIG. 1. The line 201 shows that as more RFID tags are decoupled from the excitation field (% switch off 204), the more energy is available for additional RFID tags. The increase in flux density through the center of the stack may increase the energy available to power tokens higher up in the stack. This may allow for a greater stack of game tokens (or other stacked item containing an embedded dynamic RFID tag) to be read by an RFID reader for a given excitation power output.

Note that the flux density increases as each tag goes into low-power mode. If we take 20 chips as an example, the reader may correctly read 10 tags as soon as the excitation field is energized. Once these 10 tags are turned "off", the flux density increases. Let's assume that the next command exchange correctly identifies 5 more tags. The flux density will increase again as these are also turned "off". Now let's assume the next command exchange correctly identifies 3 more tags. Again the flux density changes as these tags are turned off. Each time, the energy available at a particular tag (as shown on FIG. 2) increases. Hence the term "dynamic" power absorption.

In the "sleep" state, the tags may present a different load than when they are active. According to one embodiment, an active tag presents a load of 10 KOhm, and a sleeping tag presents a load of 500 KOhm.

Figure 3:
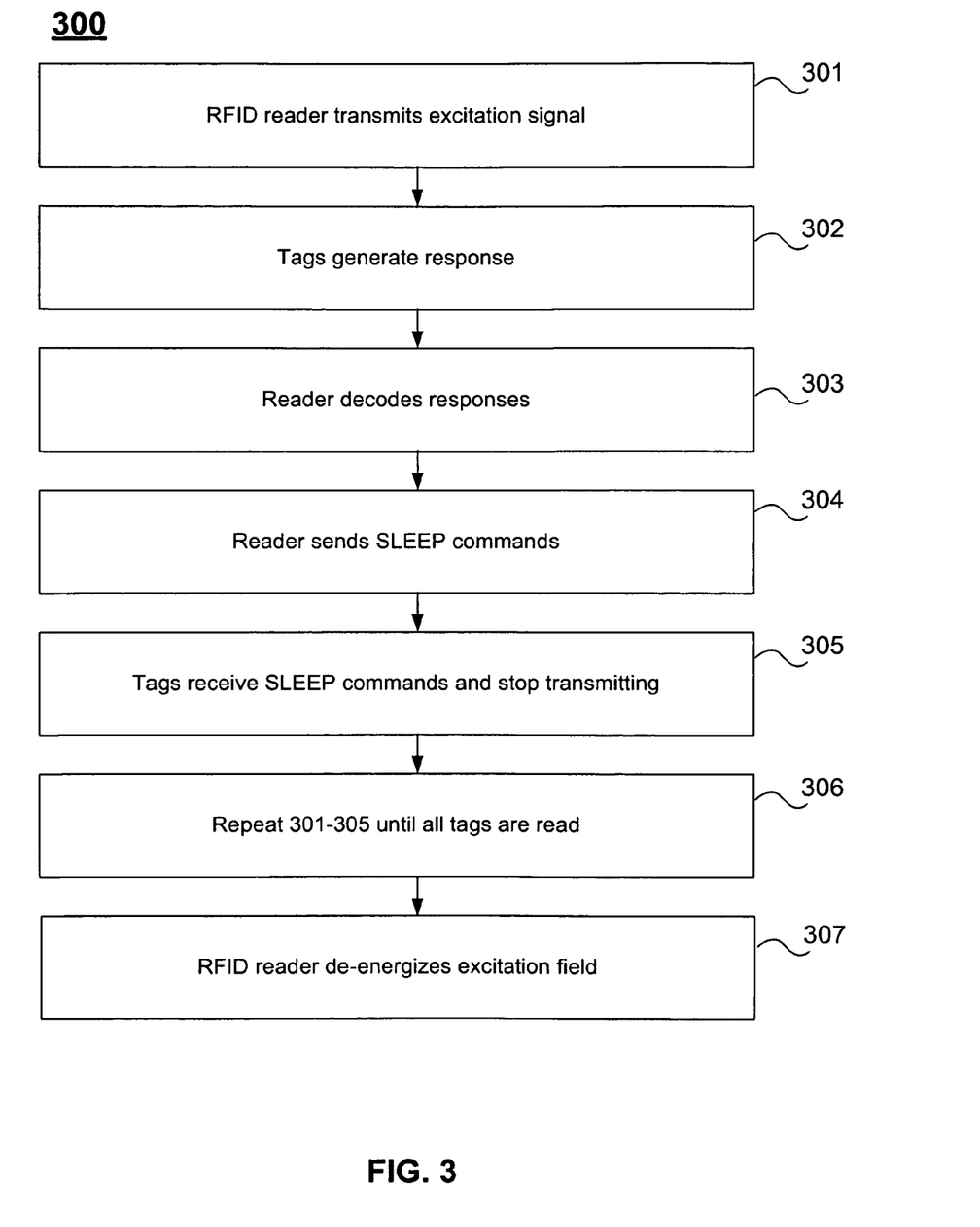
FIG. 3 is a flowchart showing a process for reading tags during a read operation according to an embodiment of the present invention.

FIG. 3 is a flowchart showing a process 300 for reading tags during a read operation according to an embodiment of the present invention. In general, the read operation includes excitation, one or more read cycles, and de-excitation.

In step 301, the reader powers up the excitation signal to energize the RFID tags in the field and then sends a READ command. Numerous protocols exist for implementing a READ command. The read command may include synchronization information, as well as information used by each tag to coordinate its response. Irrespective of the technical details of the command protocol used, the goal is to accurately identify each tag in the field in a timely manner. Each protocol has distinct advantages and disadvantages that encompass error rates, data throughput, and algorithmic complexity as well as other tactical details. According to an embodiment, a modified slotted Aloha protocol may be used. The details of this protocol are not relevant to the present invention.

In step 302, all the tags energized by the excitation field that correctly decode the READ command will generate a response. These tags then modify the excitation signal to include their responses.

In step 303, the reader attempts to decode these responses from the modified excitation signal. "Collisions" (e.g. multiple tag responses responding simultaneously) can prevent the reader from correctly decoding the tag responses. The command protocol may include error detection and/or error correction algorithms—but this level of detail is (as noted earlier) not relevant to describe the details of embodiments of the present invention.

Once the reader has correctly read a specific tag, there is no new information that can be extracted from this tag, and the energy used to power its circuitry is wasted. In step 304, the reader sends a SLEEP command to each tag that has been read. In step 305, the targeted tag decodes the SLEEP command and stops transmitting its identity. Up to this point, the READ and SLEEP commands may be no different than those used in other RFID protocols. One feature of an embodiment of the present invention is that the SLEEP command is then used to decouple the RFID tag from the excitation field generated by the excitation signal. The result: The energy consumption of each tag that has been read is reduced (e.g., minimized)—strengthening the field and extending the read range.

Step 306 repeats the data exchange and command sequence (steps 301-305) until all tags that have been energized are read. In step 307, the excitation field is de-energized, and the read cycle is complete. Re-energizing the excitation field allows the read cycle to repeat as needed.

Figure 4A:
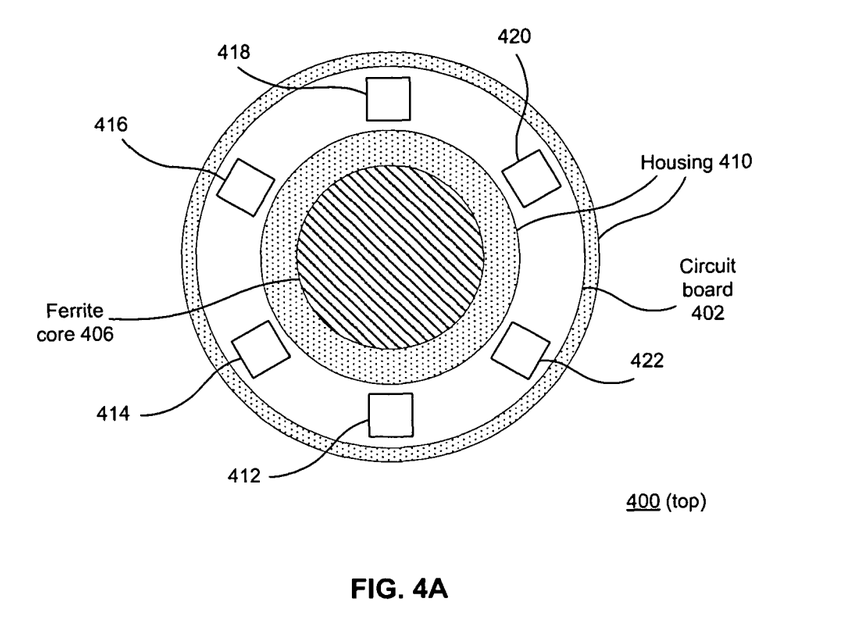
Figure 4B:
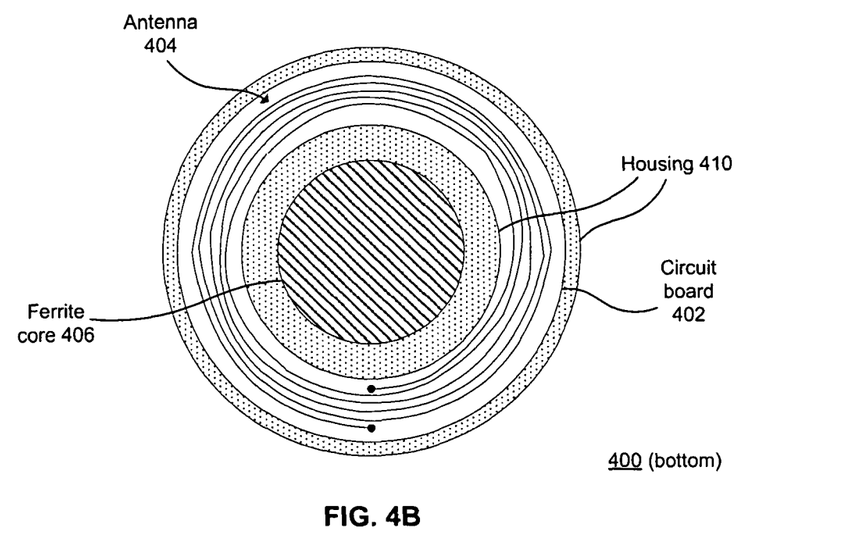

One or more of the features described above (linear power regulator and decoupling SLEEP mode) may be implemented in accordance with other design criteria for embodiments of the present invention. These embodiments may include: (1) using discrete components on a rigid or flexible printed circuit, or (2) integrating the required functions into the design of a custom ASIC. FIGS. 4A-4B show an embodiment of the present invention with the functional elements called out.

Figure 4C:
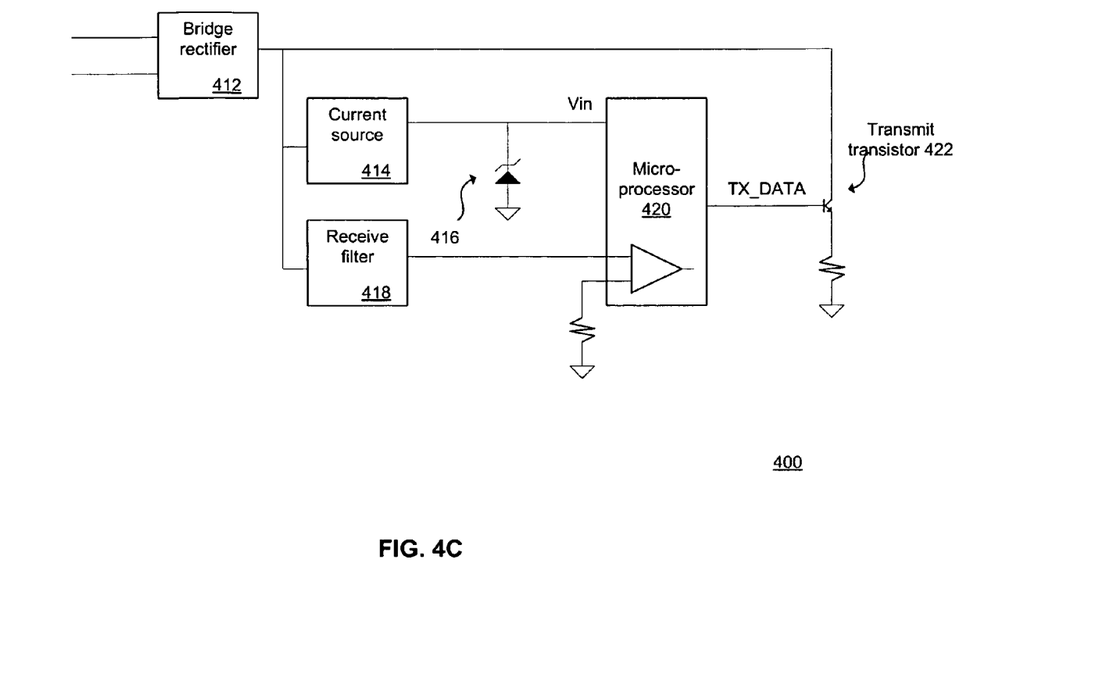
FIG. 4C is a block diagram, of a token according to an embodiment of the present invention.

FIG. 4A is a top view (cut away), FIG. 4B is a bottom view (cut away), and FIG. 4C is a block diagram, of a token 400 according to an embodiment of the present invention. The token 400 may implement the "new design" embodiments discussed above. The token 400 generally includes an antenna and tag electronics. More specifically, the token 400 includes a printed circuit board 402, an antenna 404, a ferrite core 406, a plastic housing 410, a bridge rectifier 412, a current source 414, a shunt voltage regulator 416, a receive filter 418, a microprocessor 420, and a transmit transistor 422.

The token 400 may be a gaming token such as is suitable for use in casinos. The token 400 may be circular with a diameter of 1.55 inches (39.4 mm) and a thickness of 0.125 inches (3.18 mm). These parameters may be varied as desired.

The printed circuit board 402 may be generally circular in shape, in order to conform to the form factor of circular gaming tokens. The printed circuit board 402 may be of FR-4 material and 0.020 inches in thickness. Alternatively, the circuit may be printed on a flexible substrate such as mylar.

The antenna 404 may be an 8-turn antenna etched on one side (e.g., the bottom) of the circuit board 402. These antennas may be constructed with 8 mil traces and 7 mil spacing. The inductance of the 8 turn antenna may be 3 uH. Antennas with different numbers of turns may be implemented with a different balance between inductance and resistance, according to design needs.

Many existing RFID tags use a diode rectifier followed by a voltage clamp to limit the required operating voltage range of the tag and thereby protect the tag from over-voltage. In this embodiment—tailored for "new" RFID tag designs—the power supply may be a linear power supply where there is a bridge rectifier 412 followed by a current source 414 and then a voltage clamp (shunt voltage regulator) 416. This architecture does not clamp the voltage across the coil as is typically done in RFID tags. This linear supply allows tags to operate over a broad range of magnetic field intensities. This allows tags to be read on the top of the stack—where the field is lowest—and near the bottom of the stack—where the field is highest. The net effect is an increased read range. A second set of embodiments—tailored to extracting similar read range benefits using "existing" RFID tag designs—are described later in this document.

As noted earlier, the RFID circuitry described in a block diagram format in FIGS. 4A-4C may be constructed using discrete off the shelf components on a rigid or flexible printed circuit, or integrated into the design of a custom ASIC. For example, an embodiment using an off the shelf microprocessor 420 may use a PIC microcontroller (e.g., PIC10F206T-I/OT) from Microchip Technology Inc., Chandler, Ariz. to implement the functionality described above. The microprocessor 420 stores the ID of the token 400, decodes commands from the reader, and encodes the ID of the token 400 onto the 13.56 MHz carrier. The microprocessor 420 is coupled to the receive filter 418.

The ferrite core 406 may be as described in U.S. patent application Ser. No. 12/351,774 titled "Enhancing the Efficiency of Energy Transfer to/from Passive ID Circuits Using Ferrite Cores" filed Jan. 9, 2009. The ferrite core 406 harnesses the H-field and steers it through the antenna 404. The primary physical attribute of the ferrite is its permeability. Any equivalent material that is permeable and effectively steers the H-field through the antenna loop will improve performance. Ferrite devices are commonly used with frequencies up to 1 GHz. According to an embodiment, the ferrite core 406 has a permeability of 125, plus or minus 20% (e.g., between 100 and 150). The ferrite core 406 may also be referred to as a magnetically permeable material.

The top and bottom of the token 400 may be covered with labels or stickers (not shown) to denote the denomination or other desirable information. The label may have a thickness of approximately 0.003 inches. This thickness minimizes any air gaps when the tokens are stacked (that is, it helps the ferrite cores in a stack of tokens to function as if they were a single monolithic rod of ferrite). The thickness of the label may be varied, as desired, with corresponding effects on the read performance. Alternately, the ferrite core may be exposed by using an annular sticker to further minimize any air gaps in the stack.

The decoupling embodiments discussed above may be implemented with a custom application specific integrated circuit (ASIC) that implements the functionality described above. However, the cost and time to develop such a custom ASIC may be undesirable when implementing other embodiments. In such embodiments, it may be desirable to use off-the-shelf RFID chips (for example, the SRF 66V10 from Infineon Technologies AG) that include a shunt regulator or other protective circuit. In such embodiments, it may be desirable that the shunt regulator operate minimally (if at all). The remainder of this disclosure describes embodiments that may be used when the RFID chip includes a shunt regulator.

The "Existing" Shunt Regulator Embodiments

As discussed above, an embodiment of the present invention modifies the behavior of existing "off-the-shelf" RFID tags in a manner that overcomes the self-limiting nature of their built-in shunt regulators. Specifically, a network is placed in front of the shunt regulator—between the loop antenna and the RFID chip—to limit the electrical energy (e.g., current) that reaches the chip.

Figure 5:
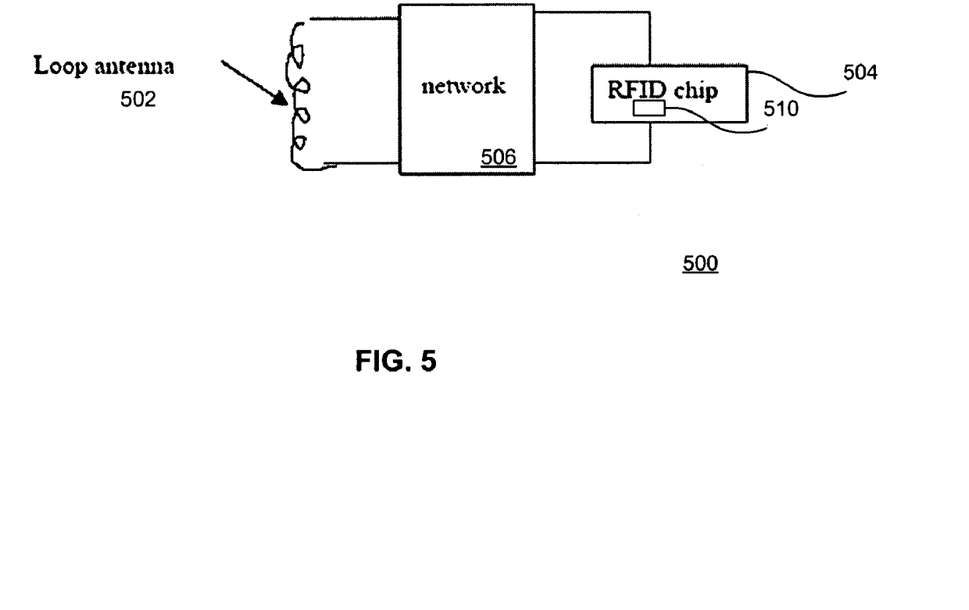
FIG. 5 is a block diagram of an RFID tag according to an embodiment of the present invention.

FIG. 5 is a block diagram of an RFID tag 500 according to an embodiment of the present invention. The RFID tag 500 includes an antenna 502, an RFID chip 504, and a network 506. The RFID tag 500 may otherwise be in the form factor of a token (e.g., the token 400 of FIG. 4) and may include other components that perform other RFID functions (e.g., as discussed above and not repeated for brevity). The antenna 502 may correspond to the antenna 404 (see FIG. 4).

The RFID chip 504 may be an off the shelf RFID chip. As such, the RFID chip 504 includes a protective circuit 510 that protects the RFID chip 504 from excessive voltage from an excitation source (e.g., an RFID reader). The protective circuit 510 may include a shunt regulator. The RFID chip 504 may be an SRF 66V10 ST microprocessor from Infineon Technologies AG. The RFID chip 504 may correspond to the microprocessor 1120 (see FIG. 11A).

The network 506 may be omitted from RFID applications where the shunt regulator is sufficient protection and where tags are not closely spaced or closely coupled. However, when tags are closely spaced and closely coupled (as may be the case for a stack of gaming tokens—especially gaming tokens using ferrite cores to steer the excitation field), this shunt regulator is detrimental and the network 506 may operated to achieve practical performance goals. Specifically, the network 506 limits the current provided to the RFID chip 504 to an amount that is sufficient to operate the tag circuitry. This effectively negates the role of the built-in protective circuit 510, minimizing the amount of excitation energy that is converted to heat by the protective circuit 510 and allowing this energy to remain in the excitation field to power other RFID tags. The network 506 helps to reduce the amount of excitation energy that is absorbed by the RFID chip 504.

Two basic network architectures may be used for the network 506. One architecture is a linear passive network with a constant reactance (e.g. a resistor or a capacitor). Another architecture is a non-linear network (e.g. varactor diodes or Schottky barrier diodes). The specific implementation details of the network 506 may take several forms and may be driven by a host of systems considerations such as maximizing system performance, minimizing the cost of the tag, and minimizing the design changes to the reader. Various details for the network 506 are provided below.

Figure 6:
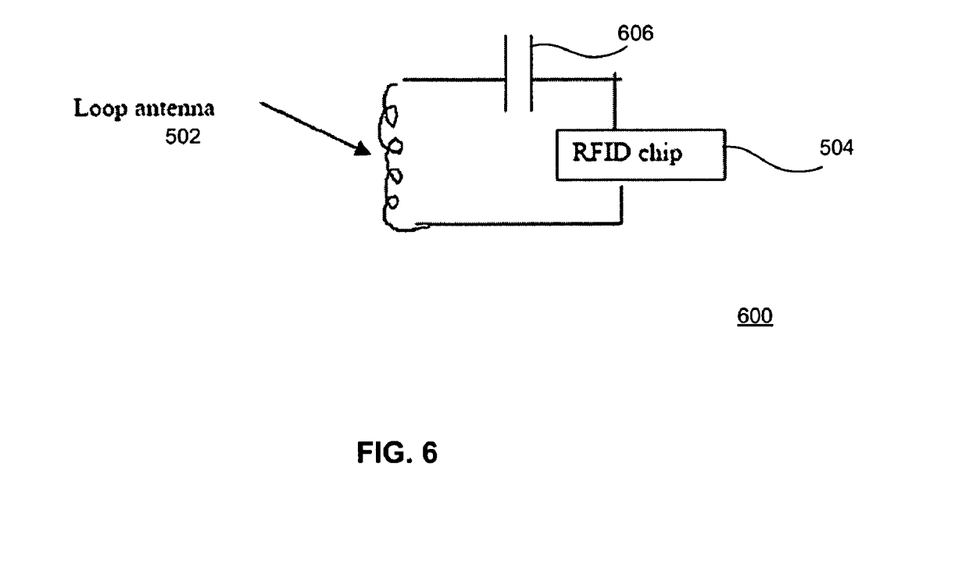
FIG. 6 is a block diagram of an RFID tag according to an embodiment of the present invention.

FIG. 6 is a block diagram of an RFID tag 600 according to an embodiment of the present invention. The RFID tag 600 includes an antenna 502, an RFID chip 504, and a capacitor 606. The RFID tag 600 may otherwise correspond to the RFID tag 500 (see FIG. 5) and the details are not repeated.

The capacitor 606 implements the network 506. Experimental results showed that different capacitances worked best for different excitation field strengths. Thus, for a given reader power output, the optimum capacitor for an RFID tag at the top of a stack of gaming tokens is different than the optimum capacitor for an RFID tag at the bottom of a stack of gaming tokens. For example, for a reader antenna output of 1 watt, and a stack of 30 tokens, the optimum capacitor value varied from 1 pF to 10 pF. Since all tokens in the stack should use identical capacitors, it was necessary to select a suitable value. A capacitor 606 in the range of 1 pF to 10 pF worked reasonably well. A capacitor 606 in the range of 3.3 pF to 4.7 pF also worked reasonably well.

One approach to the construction of the network is simply to add a discrete capacitor as shown in FIG. 6. An alternate embodiment is to use copper layers in the printed circuit board to achieve the same purpose. This is particularly feasible if the printed circuit board is constructed from flexible film as is common on RFID inlays. The inlay may be made from a biaxially-oriented polyethylene terephthalate (bo-PET) polyester film such as the Mylar™ material. The capacitor 606 may be formed on the inlay by metal deposition. A capacitor 606 formed in this way thus eliminates the need for a discrete component.

In addition to limiting the power available to the RFID chip 504, the capacitor 606 has the following tangible benefits. First, it de-couples adjacent tags—thereby minimizing shifts in resonance that can degrade system performance. Second, it allows one to increase the output power of the reader (to further extend read range) without damage to the circuitry in the RFID chip 504 circuitry.

A second approach to the construction of the network is to attempt to match the reactance of the network to the strength of the excitation field. Using the same example as before, this network would ideally look like a capacitance of 1 pF at the bottom of a stack of tokens and a capacitance of 10 pF at the top of a stack of 30 tokens. Two circuit architectures to achieve this performance are described: (1) a Varactor Diode circuit, and (2) a Shottky Barrier Diode circuit.

Figure 7:
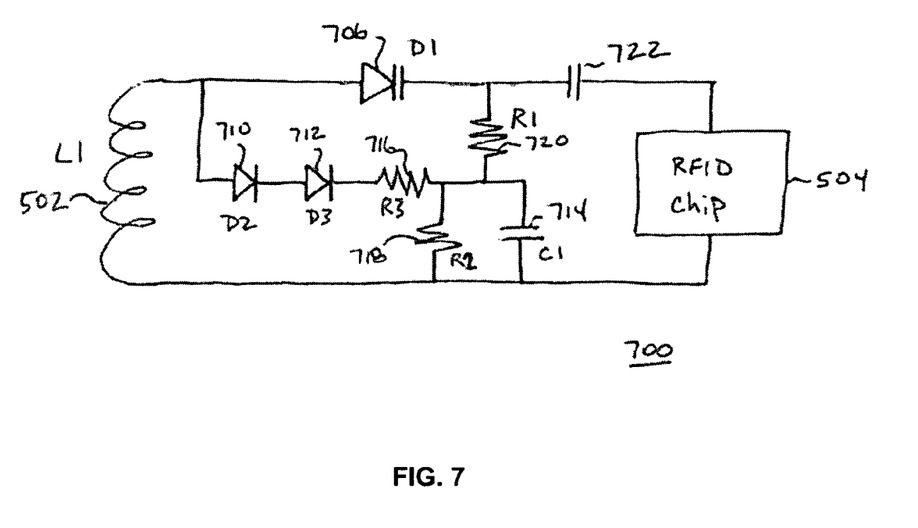
FIG. 7 is a block diagram of an RFID tag according to an embodiment of the present invention using a Varactor diode.

FIG. 7 is a block diagram of an RFID tag 700 according to an embodiment of the present invention using a Varactor diode. The RFID tag 700 includes an antenna 502, an RFID chip 504, and other components that may otherwise correspond to the RFID tag 500 (see FIG. 5), the details of which are not repeated.

The RFID tag 700 includes a varactor 706 to implement the network 506 (see FIG. 5). One feature of the design is to extract sufficient energy from the excitation field to run the RFID circuit 504 but use the characteristics of varactors to limit the current drawn by the RFID chip 504 and thereby minimize the losses (heat).

In this implementation, L1 represents the loop antenna 502 and D1 is the varactor 706. The peak voltage on the loop antenna 502 is detected using diodes D2 710 and D3 712 which charge capacitor C1 714 through resistor R3 716. For a particular varactor diode 706, there is a an optimal bias for a given voltage on the loop antenna 502. The purpose of D3 712 is to shift the bias closer to the optimum; additional diodes may be used to achieve this shift according to various specific embodiments. Resistors R3 716 and R2 718 form a voltage divider for more control of the bias. The resistor R2 718 also acts as a bleed resistor to track changes in the loop antenna 502 voltage. Resistor R1 720 is a high value resistor that applies the bias voltage held on capacitor C1 714 to the cathode of the varactor 706. The capacitor 722 provides AC coupling to the RFID chip 504. This allows the voltage on the cathode of the varactor diode 706 to increase without being affected by the RFID chip 504.

Figure 8:
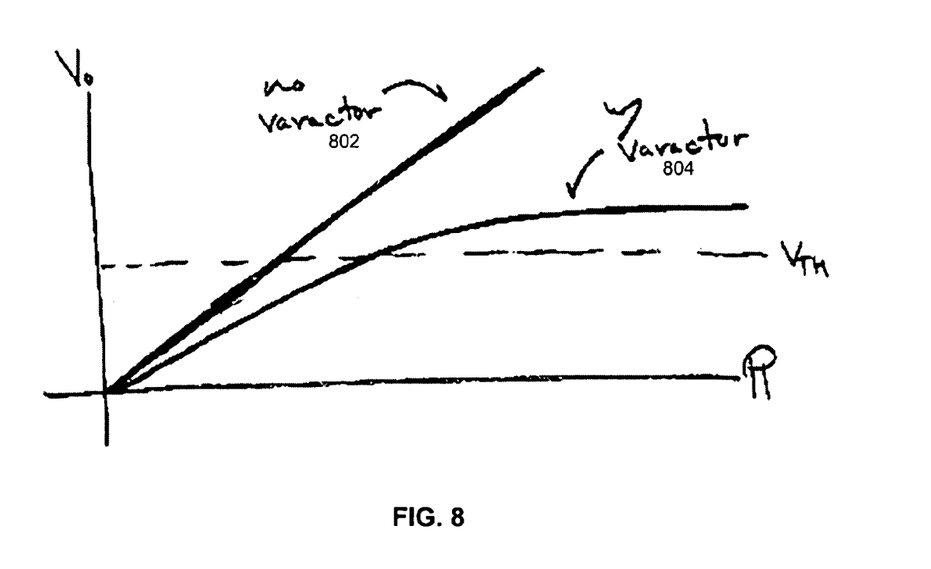
FIG. 8 is a graph comparing output voltage between an existing circuit and the circuit of FIG. 7 according to an embodiment of the present invention.

FIG. 8 is a graph comparing output voltage between an existing circuit and the circuit of FIG. 7 according to an embodiment of the present invention. The figure shows the theoretical output voltage of the loop antenna (e.g., 502) as a function of the strength of the excitation field generated by the reader and received by the tag. The line 802 shows that with no varactor, the output voltage increases in proportion to the ambient field strength—requiring a shunt regulator to protect the tag circuitry. The line 804 shows that with the varactor circuit (e.g., 706 and related components in FIG. 7), the output voltage rises quickly (using the inherent capacitance of the varactor 706 to tune the LC circuit of the loop antenna 502) and then levels off at a much smaller slope. The circuit is designed such that the bias described above is shifted such that the output voltage is above Vth—the threshold required to energize the RFID chip. The result: the circuits in the RFID chip 504 are protected when the excitation field is strong but the excess energy available is not consumed by the shunt regulator in the RFID chip 504.

Figure 9:
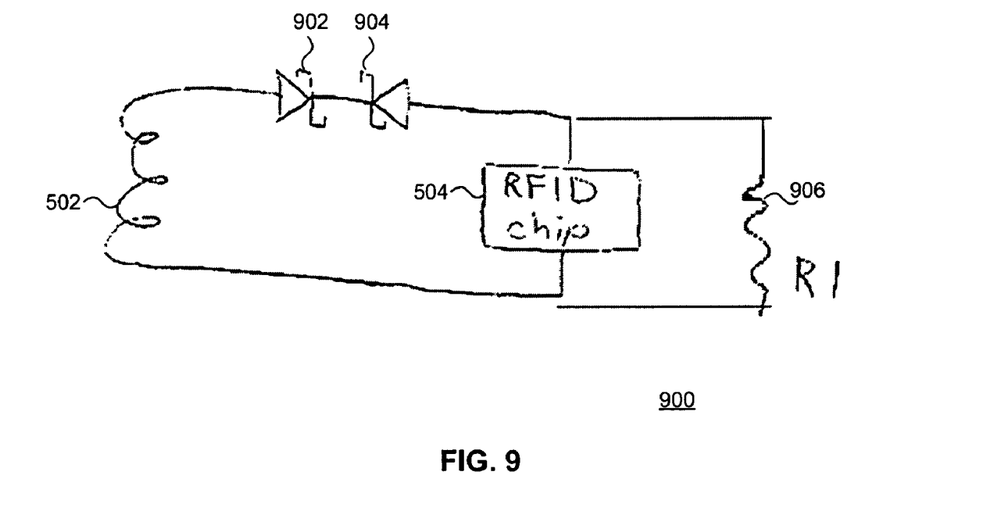
FIG. 9 is a block diagram of an RFID tag according to an embodiment of the present invention using Shottky Barrier diodes.

FIG. 9 is a block diagram of an RFID tag 900 according to an embodiment of the present invention using Shottky Barrier diodes. The RFID tag 900 includes an antenna 502, an RFID chip 504, and other components that may otherwise correspond to the RFID tag 500 (see FIG. 5), the details of which are not repeated.

The RFID tag 900 includes two Schottky barrier diodes 902 and 904 in series with the RFID chip 504. The capacitance of these diodes 904 and 904 changes as reverse bias is applied to them. Thus, when the voltage on the top of the antenna 502 is (for example) +1 volt, the first diode 902 is forward biased, which simply reduces the voltage to about 0.7 volts at the cathode of the second diode 904. Using the specifications for a BAT54 diode (Fairchild Semiconductor Corp., South Portland, Me.), this condition results in a capacitance of about 9 pF. If, on the other hand, the voltage on the top of the antenna 502 is 10 volts, the reverse bias on the second diode 904 is 9.7 volts and the resulting capacitance is 4 pF. If the voltage at the top of the antenna 502 is negative, the roles of the two diodes 902 and 904 is reversed with the same net result. The resistor R1 906 ensures that a reverse bias can be generated and may be omitted depending on the internal design of the RFID chip 504.

Multiple variants on the architecture of FIG. 9 are possible. For example, two varactor diodes may be in parallel with the Schottky barrier diodes 902 and 904, with the cathodes of all four diodes tied together. The Schottky diodes 902 and 904 in this case may have low capacitance so that the variable capacitance is determined by the varactors. In this case, the Schottky barrier diodes 902 and 904 prevent the varactor diodes from conducting current in the forward direction. Similarly, one could use transistors in the network because their collector capacitance also varies with voltage.

Figure 10:
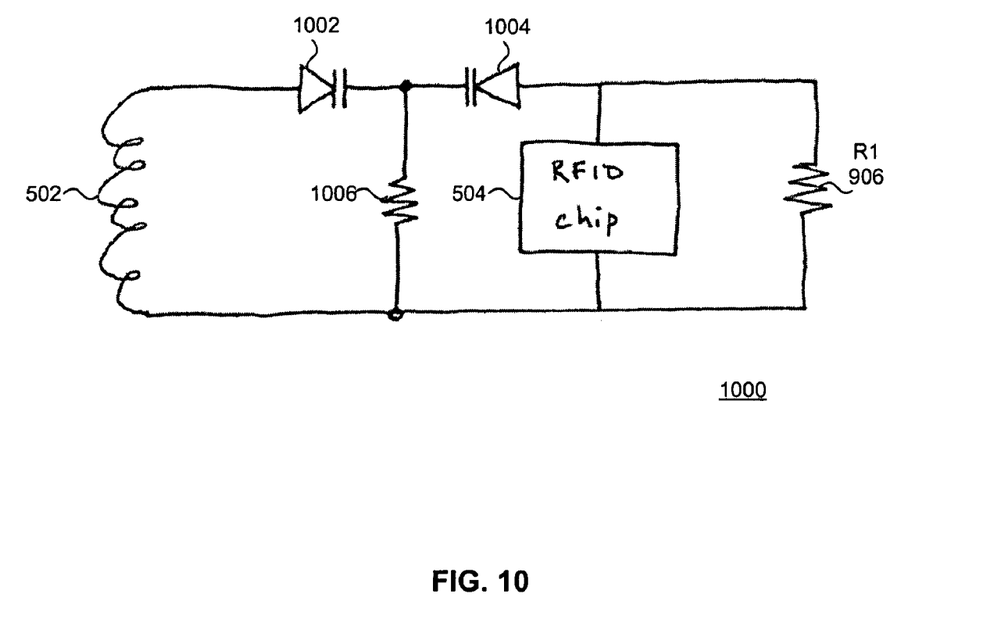
FIG. 10 is a block diagram of an RFID tag 1000 according to an embodiment of the present invention using varactor diodes.

FIG. 10 is a block diagram of an RFID tag 1000 according to an embodiment of the present invention using varactor diodes. FIG. 10 is similar to FIG. 9, with the Schottky diodes (902 and 904 in FIG. 9) replaced with varactor diodes 1002 and 1004, and a resistor 1006 added to connect their cathodes to the bottom of the coil 502. Similarly, varactor diodes may be combined with Schottky diodes to get the desired response.

Figure 11A:
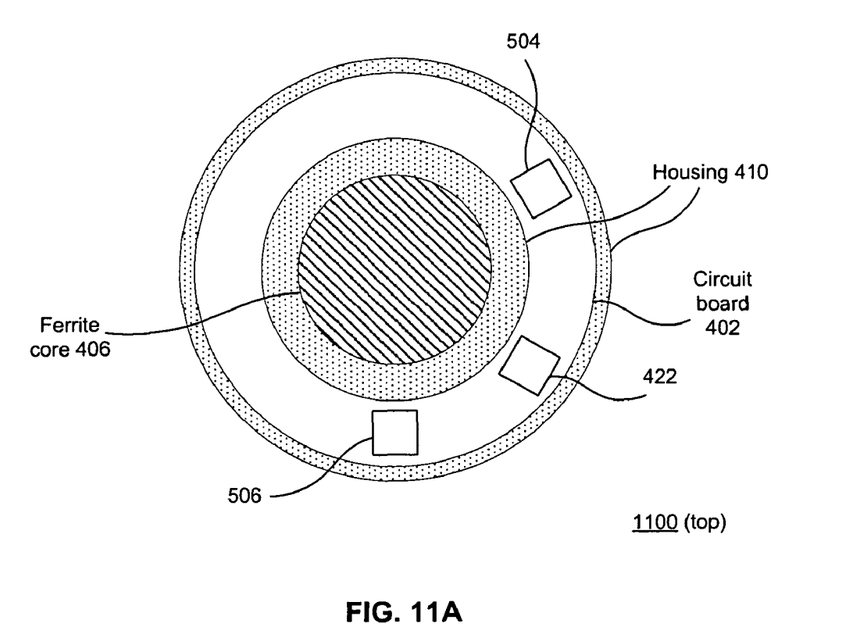
FIG. 11A is a top view (cut away) and FIG. 11B is a bottom view (cut away) of a token according to an embodiment of the present invention.
Figure 11B:
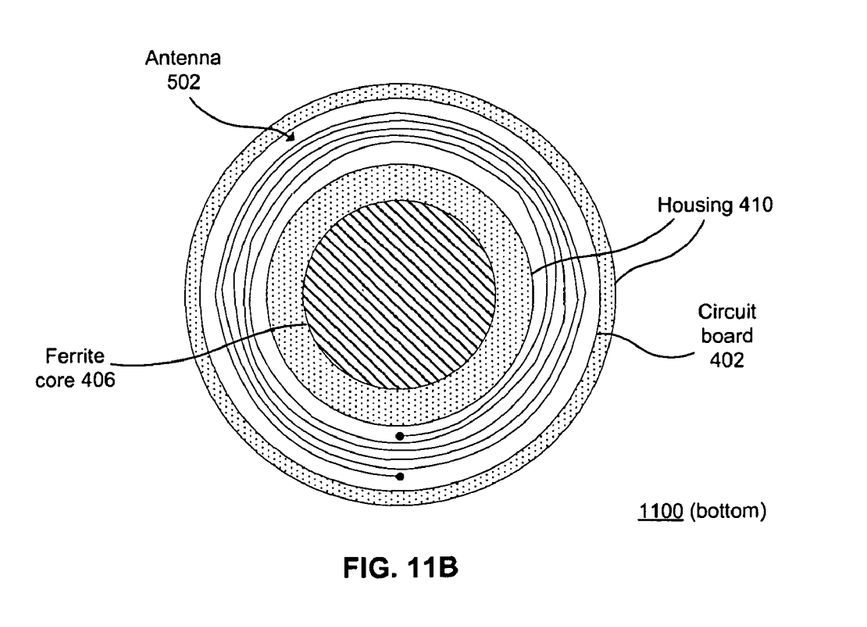

FIG. 11A is a top view (cut away) and FIG. 11B is a bottom view (cut away) of a token 1100 according to an embodiment of the present invention. The token 1100 may implement the "existing design" embodiments discussed above. The token 1100 is similar to the token 400 (FIGS. 4A-4C), and for conciseness the similar elements will not be described again. The token 1100 may otherwise include the elements of FIG. 5 (the antenna 502, the RFID chip 504, and the network 506).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. An apparatus including a circuit for performing radio frequency identification (RFID), comprising:
   a plurality of gaming tokens, wherein the plurality of gaming tokens are closely spaced and wherein each of the plurality of gaming tokens comprises:
   an antenna that is configured to receive energy from an excitation source;
   RFID electronics; and
   a linear power supply, coupled between the antenna and the RFID electronics, that extracts from the energy a constant current to operate the RFID electronics, wherein the constant current is sufficient to power the RFID electronics and manages excess excitation energy such that energy consumption is reduced,
   wherein the linear power supply in each of the plurality of gaming tokens are configured to reduce an energy absorbed by one gaming token such that the energy from the excitation source is available to power others of the plurality of gaming tokens.

2. The apparatus of claim 1, wherein the energy consumption is less than an unmodified energy consumption, wherein the unmodified energy consumption corresponds to the antenna and the RFID electronics without the linear power supply.

3. The apparatus of claim 1, wherein the linear power supply includes:
   a bridge rectifier;
   a current source; and
   a voltage clamp.

4. An apparatus including a circuit for performing radio frequency identification (RFID), comprising:
   a plurality of gaming tokens, wherein the plurality of gaming tokens are closely spaced and wherein each of the plurality of gaming tokens comprises:
   an antenna that is configured to receive electrical energy from an excitation source;
   RFID electronics including a protective circuit; and
   a network, coupled between the antenna and the RFID electronics, that reduces electrical energy provided by the antenna to the RFID electronics by managing excess excitation energy,
   wherein the network in each of the plurality of gaming tokens are configured to reduce an energy absorbed by one gaming token such that the electrical energy from the excitation source is available to power others of the plurality of gaming tokens.

5. The apparatus of claim 4, wherein the protective circuit includes a shunt regulator.

6. The apparatus of claim 4, wherein the network limits a current provided by the antenna to the RFID electronics.

7. The apparatus of claim 4, wherein the network reduces the electrical energy absorbed by the RFID electronics.

8. The apparatus of claim 4, wherein the network reduces heat generated by the protective circuit.

9. The apparatus of claim 4, wherein the network protects the RFID electronics from an increased power output from a reader device.

10. The apparatus of claim 4, wherein the network includes a capacitor.

11. The apparatus of claim 4, further comprising:
    a housing that covers the antenna, the RFID electronics and the network, wherein the housing adapts the apparatus for use as a gaming token.

12. The apparatus of claim 4, further comprising: a magnetically permeable core that vertically steers a magnetic flux field of the gaming token, wherein the magnetic flux field results from electromagnetic energy generated by a RFID reader device.

13. The apparatus of claim 1, wherein the linear power supply is configured to manage the excess excitation such that the energy consumption is reduced by decoupling the gaming token from the excitation source.

14. The apparatus of claim 1, wherein the linear power supply is configured to manage the excess excitation such that the energy consumption is reduced by opening an antenna loop of the antenna.

15. The apparatus of claim 1, wherein the linear power supply is configured to manage the excess excitation such that the energy consumption is reduced by putting the RFID electronics into a sleep mode.

16. The apparatus of claim 4, wherein the network is configured to reduce the electrical energy provided by the antenna to the RFID electronics by decoupling the gaming token from the excitation source.

17. The apparatus of claim 4, wherein the network is configured to reduce the electrical energy provided by the antenna to the RFID electronics by opening an antenna loop of the antenna.

18. The apparatus of claim 4, wherein the network is configured to reduce the electrical energy provided by the antenna to the RFID electronics by putting the RFID electronics into a sleep mode.

19. The apparatus of claim 1, wherein the plurality of gaming tokens are closely spaced in a stack.

20. The apparatus of claim 1, wherein the plurality of gaming tokens are closely spaced such that the plurality of tags couple.

21. The apparatus of claim 1, wherein the plurality of gaming tokens comprise a first set of gaming tokens in a sleeping state and a second set of gaming tokens in an active state, wherein the first set being closer to the excitation source increases the energy from the excitation source available to the second set.

* * * * *